(No Model.)

3 Sheets—Sheet 1.

E. M. G. HEWETT.
ELECTRIC MOTOR.

No. 460,087.

Patented Sept. 22, 1891.

Witnesses:
J. B. McGirr.
F. T. Chapman

Inventor,
Ernest M. G. Hewett,
By Joseph Lyons,
Attorney.

(No Model.) 3 Sheets—Sheet 3.

E. M. G. HEWETT.
ELECTRIC MOTOR.

No. 460,087. Patented Sept. 22, 1891.

Witnesses:
J. B. McGinn.
F. T. Chapman

Inventor,
Ernest M. G. Hewett,
By Joseph Lyons.
Attorney

UNITED STATES PATENT OFFICE.

ERNEST M. G. HEWETT, OF BOSTON, ASSIGNOR TO GEORGE L. WEIL, OF NORTH ANDOVER, MASSACHUSETTS.

ELECTRIC MOTOR.

SPECIFICATION forming part of Letters Patent No. 460,087, dated September 22, 1891.

Application filed April 2, 1891. Serial No. 387,369. (No model.)

*To all whom it may concern:*

Be it known that I, ERNEST M. G. HEWETT, a citizen of the United States, and a resident of Boston, in the county of Suffolk, State of Massachusetts, have invented certain new and useful Improvements in Electric Motors, of which the following is a specification.

My invention has reference to improvements in electric motors, the object being to simplify the construction of such motor, so that its parts may be easily assembled and taken apart for repair and inspection and to increase its efficiency.

In the accompanying drawings, which form a part of this specification, I have illustrated my improved electric motor in its preferred form; but I desire it to be understood that I may vary the construction as to details and general appearance without departing from my invention.

Figure 1:
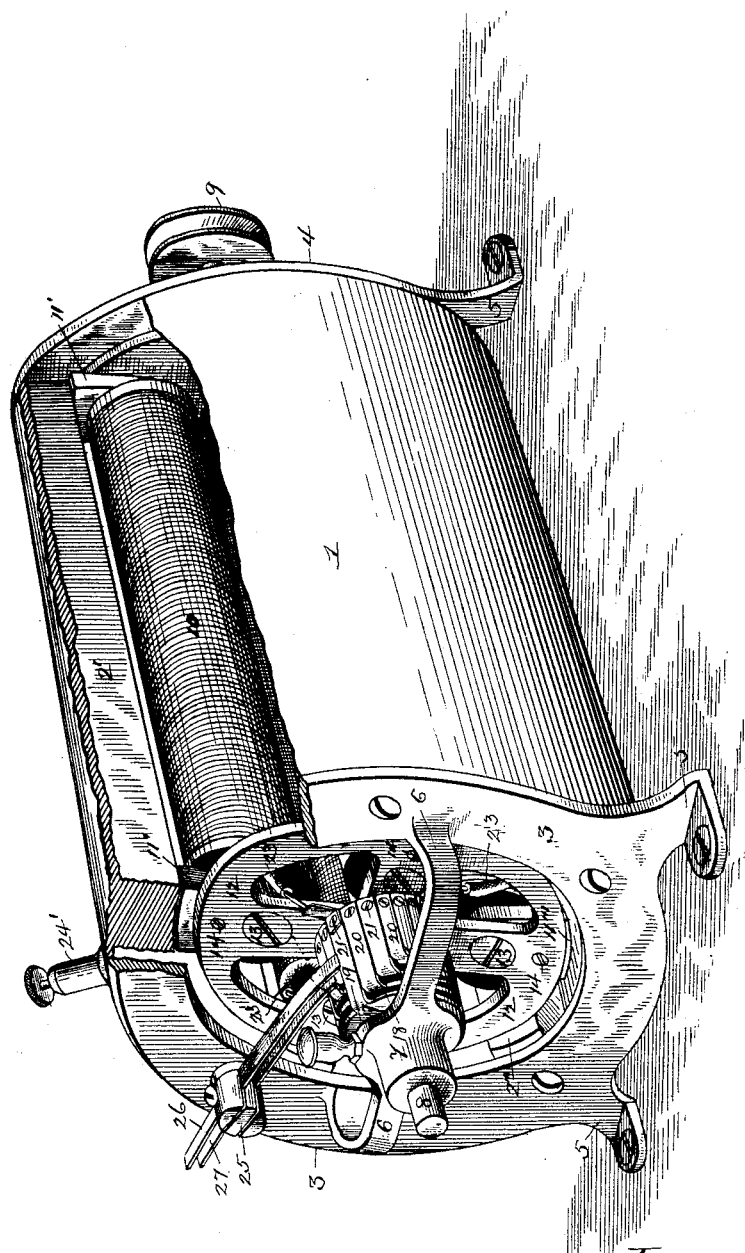
Figure 2:
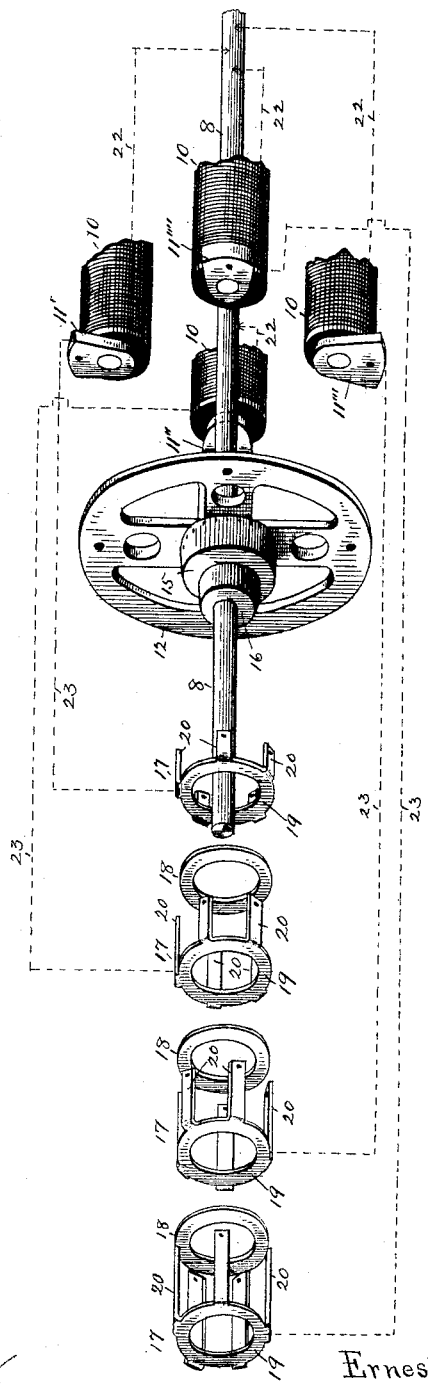
Figures 3, 4:
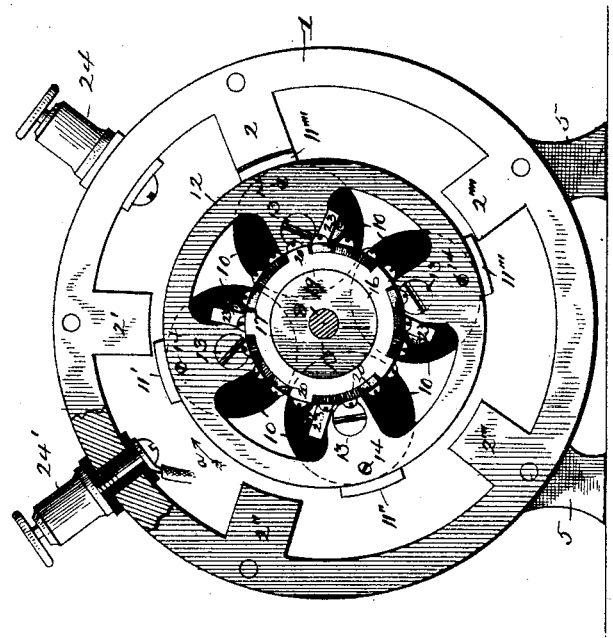

Figure 1 represents a perspective view with a part of the casing cut away so as to expose the interior. Fig. 2 is a like view of the rotating field-magnets with the commutator-plates and one of the non-magnetic heads or webs for the field-magnets all in their relative positions when about to be assembled. Fig. 3 is a view of the commutator end of the motor, partly in section, with the face-plate removed; and Fig. 4 is a diagrammatic representation of the commutator, the rotating field-magnets, and circuit connections.

Like numerals of reference indicate like parts throughout the drawings.

My improved electric motor belongs to the class in which the rotating element only is directly energized by the current, and therefore constitutes the magnetic field of force of the motor, while the stationary element is only energized by magnetic induction from the field, and therefore constitutes the armature of the motor. In my improved motor this armature is a cylindrical casing or shell 1, of iron or other magnetic material. This cylinder 1 has formed on its inner face a series of evenly-spaced radial projections 2 2' 2'', &c., which extend throughout the whole length of the cylinder, and the end faces of these projections are curved upon the line of a circle common to all, and, as will hereinafter be seen, they constitute the effective portions of the armature, and will hereinafter be referred to as the polar ridges of the armature. It will be seen that this armature may be cast in one piece and requires no dressing except at the ends of the polar ridges, which are preferably turned off, so that their faces may all be segments of one and the same cylindrical surface; but if the casting is good even this may be omitted.

Face-plates 3 and 4 are provided for each end of the armature-cylinder and are screwed or otherwise secured to the body of the same, and these face-plates are formed with legs 5, by which the whole motor is supported. On the commutator end of the motor the face-plate 3 is formed with a bracket 6, which has a boss 7 formed in the middle and which serves as a bearing for the shaft 8 of the field-magnets. This bracket projects sufficiently beyond the outer face of the face-plate 3 to accommodate the commutator, which is placed on the shaft at this end of the machine. The face-plate 4 may be constructed in the same manner; but since no commutator is at that end of the machine this face-plate may be constructed in any other desired manner, so long as provision is made for a bearing for the field-magnet shaft. At this farther end of the machine a pulley 9 is ordinarily secured to the field-magnet shaft for transmitting the power to any desired point. The field-magnets are ordinary straight-bar electro-magnets 10 10, provided at each end with polar projections 11' 11'', &c., and these magnets are arranged parallel to and symmetrically about the shaft 8, with their polar projections turned outwardly, so that when all the magnets are in place about the shaft and this shaft is placed in position coincident with the axis of the armature-cylinder the polar projections, the ends of which are curved, form the segments of a cylinder slightly smaller than the cylinder, which is determined by the faces of the polar ridges 2, but concentric therewith. The shaft is keyed to spiders 12 12', made of non-magnetic material, and the field-magnets are fastened between and to these spiders by screws 13 14 or in any other suitable manner. Between the spider 12 and the bracket 6 the shaft 8 carries a cylindrical boss 15 of insulating material, formed with an offset, so that its front portion 16 is reduced in diameter, and upon this boss 15 16 the commutator is mounted. This commutator consists of a series of metallic skeleton sleeves 17, insulated from each other by washers 18, and constructed and assembled as follows:

Each skeleton sleeve consists of an annulus 19, struck up from sheet metal, together with a number of radial arms 20, extending outwardly, but bent at right angles to the plane of the annulus. The dimensions of these skeleton sleeves are such that the aperture of the annulus closely fits the reduced portion 16 of the insulating-boss, while the arms 20 embrace the main body of the boss, closely fitting the same. The skeleton sleeves are assembled to form the commutator in the following manner: One of these sleeves is directly placed upon the boss, and by screws 21, passing through the arms 20, is fastened to that boss. A washer 18, of insulating material, is placed upon the reduced portion 16 of the boss and against the outer face of the first skeleton sleeve. Another sleeve of the same description is then placed upon the boss and against the outer face of the washer in such manner that the arms 20 of the second sleeve pass between the arms of the first sleeve close to the same, but without touching, so that a narrow insulating-space is left between the arms belonging to the two sleeves. In this manner all the sleeves and washers constituting the commutator are placed upon the boss 15 16, and the width of the arm 20 is such that when all the sleeves are in position the whole surface of the boss 15 is covered by the same, with the narrow insulating-spaces between them, as above stated. One terminal 22 of each coil of the field-magnets is connected with the shaft 8, as indicated diagrammatically in Fig. 2, and the other terminals 23 of these field-coils are connected each to one skeleton sleeve. There are therefore as many skeleton sleeves to the commutator, and consequently as many groups of contact-plates in the commutator, as there are field-magnet coils. The number of the arms 20 for each skeleton plate, and consequently the number of contact-plates for each group, is arbitrary, but is preferably made as great as is practicable without unduly increasing the size of the commutator.

In the drawings I have shown five arms on each skeleton sleeve, and, as will hereinafter be seen, this determines five revolutions of magnetism in the field for each revolution of the field-magnets. The number of polar ridges in the armature should be greater than the number of field-magnets, and by preference there is an even number of field-magnets and an odd number of polar ridges, whereby a dead-center is avoided.

In the drawings there are shown four electro-magnets and five polar ridges; but this may be changed, as will now be understood.

As has been stated above, the terminals 22 of the field-magnet coils are connected with the shaft 8, which, through its bearings, is in electrical connection with the armature-casing. The latter, therefore, or a binding-post 24, mounted on the same, is one terminal of the motor-circuit. An insulated brush-holder 25, with two brushes 26 27, is mounted on the face-plate 3, and is electrically connected with the binding-post 24', mounted on but insulated from the armature-casing. This binding-post 24' therefore constitutes the second terminal of the armature-circuit, and the source of current 28 is connected with these two terminals.

From Fig. 4 of the drawings the operation of the motor will be readily understood. In this figure of the drawings the commutator is represented in an arbitrary diagrammatic view. The different skeleton sleeves constituting the commutator are represented as flattened out, with the arms 20 in the same plane with the annulus, and each sleeve is distinguished from every other by different shading.

It will now be seen that the first sleeve 17', from which the arms 20' radiate, is followed by the sleeve 17'', from which the arms 20'' radiate. This again is followed by the sleeve 17''', from which the arms 20''' radiate, and so forth, the blank spaces indicating that these sleeves are insulated from each other.

The two commutator-brushes, which are independently adjustable, should be so adjusted that the distance between their bearing-edges is slightly less than the width of one of the arms 20, so that in the operation of the motor during the greater part of the rotation of the field-magnets the two brushes will be on two successive commutator-strips, and such relation is indicated in Fig. 4. If now the system of field-magnets rotates, together with the commutator, in the direction of the arrow $a$, the brushes will bear alternately upon two successive commutator-bars and upon one such bar only; but the time during which the two brushes will be upon one bar only will be exceedingly short. Tracing the course of the current through the machine during the phase of operation represented in Fig. 4, it will pass from the positive pole of the generator to the insulated binding-post 24' and divide at the brush-holder 25, one branch passing by the brush 26 to the skeleton sleeve 17'''' to the terminal 23 of field-magnet 10', through that field-magnet to the shaft 8, the casing, and by binding-post 24 to the other pole of the battery. The other branch will pass by the brush 27, to the skeleton sleeve 17', to field-magnet 10'', returning to the other pole of the battery in the same manner as the first branch. In this position of the brushes the field-magnet poles 11' and 11'' of the energized electro-magnet will have the relation to the polar ridges 2' 2'' indicated in Fig. 3— that is to say, the pole-pieces 11' will be fairly within the magnetic attraction of the polar ridge 2', while the pole-pieces 11'' will just have passed the neutral line between the polar ridges 2''' and 2''. The two magnets belonging to the pole-pieces 11' and 11'' will therefore be attracted, respectively, by the polar ridges 2' and 2'', whereby the system of field-magnets is turned in the direction of the arrow $a$ until the pole-pieces 11' are in alignment with the polar ridge 2'. At this moment the brush 26 will pass from the commutator-bar 20'''' onto the commutator-bar 20', which the brush 27 is about leaving, but has not yet left, so that for one instant the whole current will pass through the electro-magnet 10'', which is connected with the skeleton sleeve 17' belonging to the commutator-bar 20'. In the next instant, however, the commutator-brush 27 will pass from 20' to 20'', so that now the current will again divide, one portion of it going to the electro-magnet 10'' by brush 26 and the other portion to electro-magnet 10''' by brush 27. By this time the pole-pieces 11'' will have advanced toward the polar ridge 2'' about as close as 11' is shown in the drawings to be to 2', while the poles 11''' will just have passed the neutral line between the polar ridges 2''' and 2''''. It will now be seen that as this operation continues the next pair of magnets that will come into operation will be 10''' and 10'''', then 10'''' and 10', &c., and that a complete revolution of the magnetism in the field-magnets is accomplished by the time when brush 26 bears upon the next commutator-bar 20'''' and the brush 27 on the next commutator-bar 20'. Consequently there are as many magnetic revolutions for each revolution of the field-magnets as there are arms to each skeleton sleeve, or, what is the same thing, as there are commutator-bars belonging to one group. By reason of the fact that at all times during the operation of this motor the circuit is closed through at least one field-magnet the sparking at the commutator is reduced to a minimum. The induced magnetism in the stationary cylindrical armature travels, of course, at the same rate as the magnetism in the field-magnets, with this difference, however, that in the armature the shift of magnetism is gradual and not intermittent, owing to the fact that the polar ridges are connected by the magnetic shell 1. The smooth working of the motor is largely due to these facts.

The skeleton sleeves of which the commutator is composed are, as has been seen, each a single piece of metal, and they may all be struck out by the same die, since they are all alike, with the exception of the length of the radial arms. In practice, therefore, these sleeves are all made alike, and after the commutator has been built up by the same the arms then projecting beyond the boss 15 are cut away. It will readily be seen that by reason of this construction the commutator is made with great ease and that its parts are interchangeable.

Having now fully described my invention, I claim and desire to secure by Letters Patent—

1. In an electric motor, a rotating element consisting of a series of straight-bar electro-magnets mounted upon a common shaft, with their like poles at one end, in combination with a stationary magnetic enveloping-shell serving as an armature to the rotating element, substantially as described.

2. In an electric motor, the combination of a system of rotary field-magnets composed of straight-bar electro-magnets having their like poles at one end mounted parallel to and about a common shaft and having outwardly-turned pole-pieces, with a stationary armature consisting of a magnetic shell enveloping the field-magnets and having inwardly-projecting polar ridges extending throughout the whole length of the shell and parallel to the axis thereof, substantially as described.

3. In an electric motor, a stationary armature consisting of a magnetic shell having internal polar ridges parallel to the axis of the shell, in combination with a rotating system of field-magnets composed of bar electro-magnets having their like poles at one end and grouped symmetrically about and secured to a common shaft, with pole-pieces at the ends of the electro-magnets turned outwardly in operative relation to the polar ridges of the armature, and suitable circuit connections, substantially as described.

4. In an electric motor, a rotary element consisting of a series of straight-bar electro-magnets mounted upon a common shaft, with their like poles assembled at one end, in combination with a commutator for shifting the current from magnet to magnet, stationary polar ridges in operative relation to the magnets, and a magnetic shell enveloping the magnets and connecting the polar ridges and serving as a continuous medium for the shift of induced magnetism, substantially as described.

5. In an electric motor the rotating element of which consists of a series of successively energized electro-magnets, a commutator composed of a series of metallic skeleton sleeves, each consisting of a sheet-metal annulus having a number of arms integral therewith and bent flatwise at right angles to the plane of the annulus in one direction from the same, substantially as described.

In testimony whereof I have signed my name to this specification in the presence of two subscribing witnesses.

ERNEST M. G. HEWETT.

Witnesses:
F. T. CHAPMAN,
JOS. FORREST.